United States Patent [19]

Anderson et al.

[11] Patent Number: 4,627,333
[45] Date of Patent: Dec. 9, 1986

[54] STORAGE STRUCTURE

[75] Inventors: Thomas H. Anderson; Donald E. Anderson, both of 1833 S. Holland Sylvania Rd., Maumee, Ohio 43537; Glenn E. Hall; Roy W. Blanton, both of Toledo, Ohio

[73] Assignee: The Andersons, Maumee, Ohio

[21] Appl. No.: 675,207

[22] Filed: Nov. 27, 1984

[51] Int. Cl.⁴ ............................................. A01F 25/08
[52] U.S. Cl. ............................................ 98/56; 98/52; 99/646 S; 135/99
[58] Field of Search ................... 98/52, 55, 56; 99/646 S; 135/99; 160/53, 368 G; 414/287, 292, 299, 325, 326, 418, 919

[56] References Cited

U.S. PATENT DOCUMENTS

| 179,976 | 7/1876 | Tuck et al. | |
|---|---|---|---|
| 842,538 | 1/1907 | Elward | 98/56 |
| 1,909,066 | 5/1933 | Nemec. | |
| 2,811,164 | 10/1957 | Ames | 135/99 X |
| 2,895,400 | 7/1959 | Topf | 98/55 |
| 3,196,774 | 7/1965 | Kripal | 98/55 |
| 3,727,656 | 4/1973 | Luders | 150/1 |
| 4,162,017 | 7/1979 | Noyoh | 414/287 X |
| 4,224,770 | 9/1980 | Petty | 52/82 |
| 4,413,029 | 11/1983 | Handwerker | 428/61 |
| 4,454,807 | 6/1984 | Wolstenholme | 99/646 S |
| 4,493,248 | 1/1985 | Wolstenholme | 98/52 |
| 4,502,369 | 3/1985 | Aldag | 98/56 |

FOREIGN PATENT DOCUMENTS

| 1418308 | 10/1965 | France | 135/99 |
|---|---|---|---|
| 884620 | 11/1981 | U.S.S.R. | 98/56 |
| 993874 | 2/1983 | U.S.S.R. | 99/646 S |

Primary Examiner—Harold Joyce
Attorney, Agent, or Firm—Emch, Schaffer, Schaub & Porcello Co.

[57] ABSTRACT

A method and apparatus for storing a particulate material in a storage assembly. The storage assembly includes a wall for retaining the particulate material and a cover. A cap is positioned above the cover and mounts a vertically movable ring assembly. During filling, the ring assembly is adjusted to tension the cover. A flow of fluid is provided through said stored particulate material for maintaining the temperature within the stored particulate material within a predetermined upper and lower limit and also urges the cover into contact with the particulate material.

17 Claims, 19 Drawing Figures

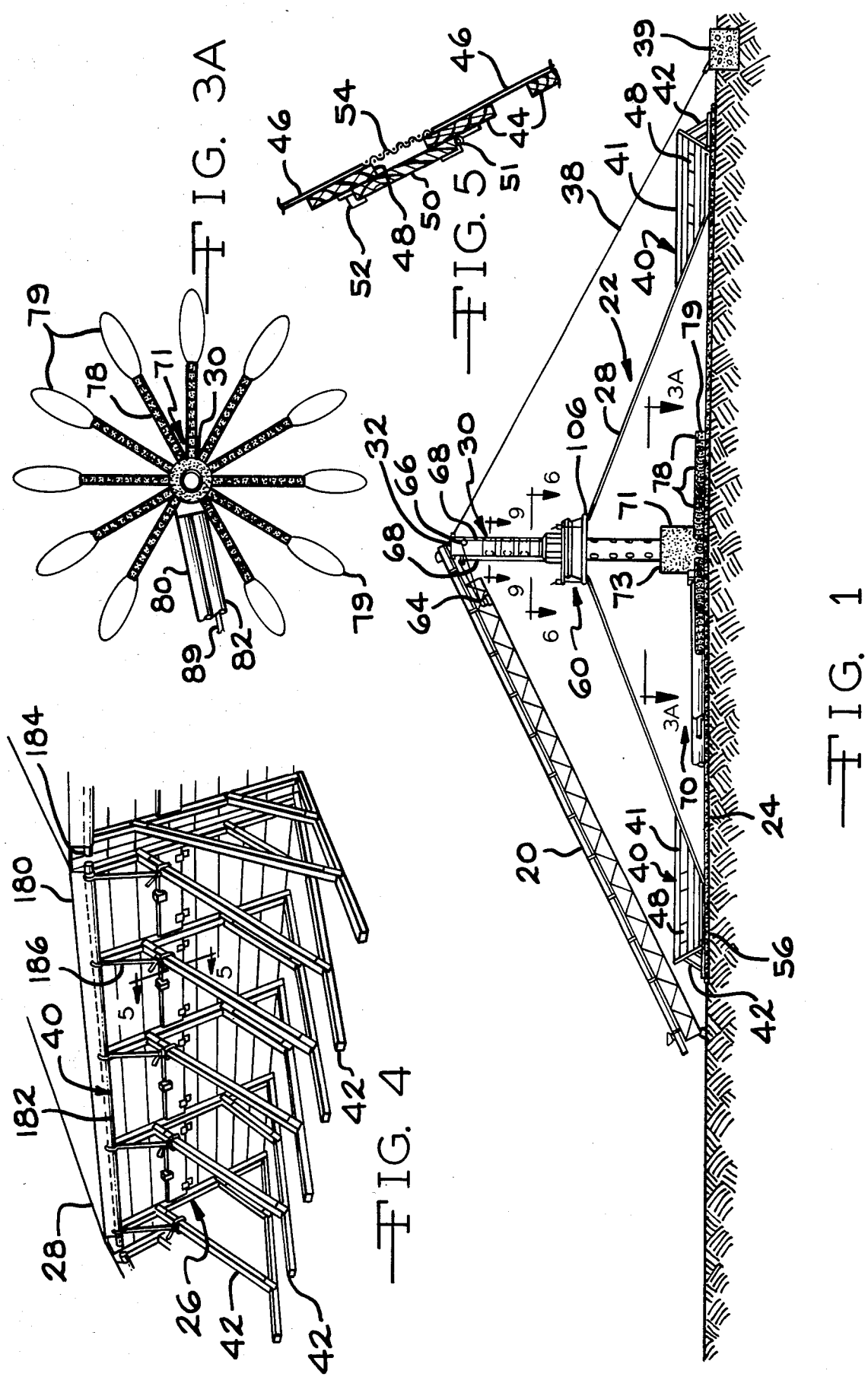

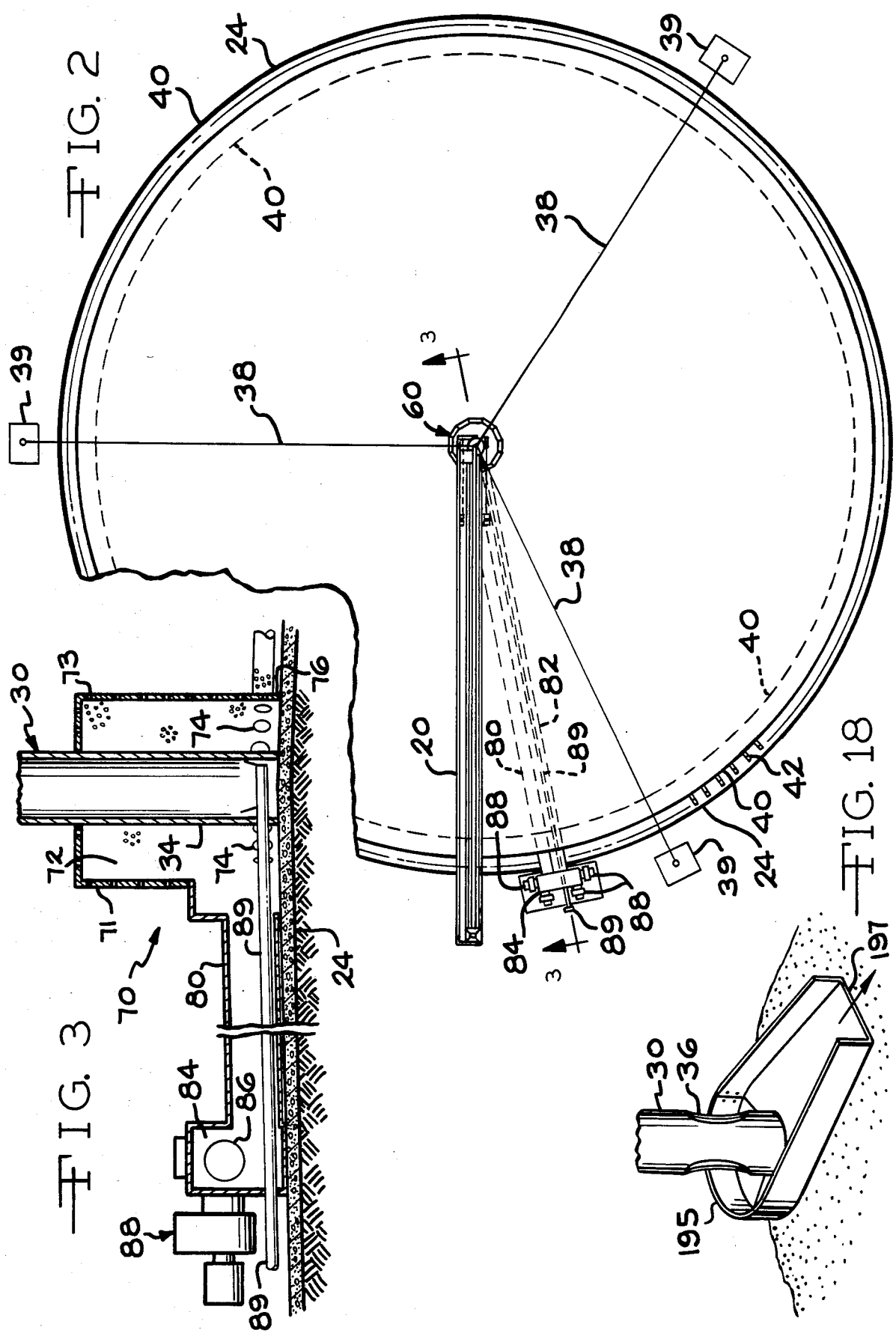

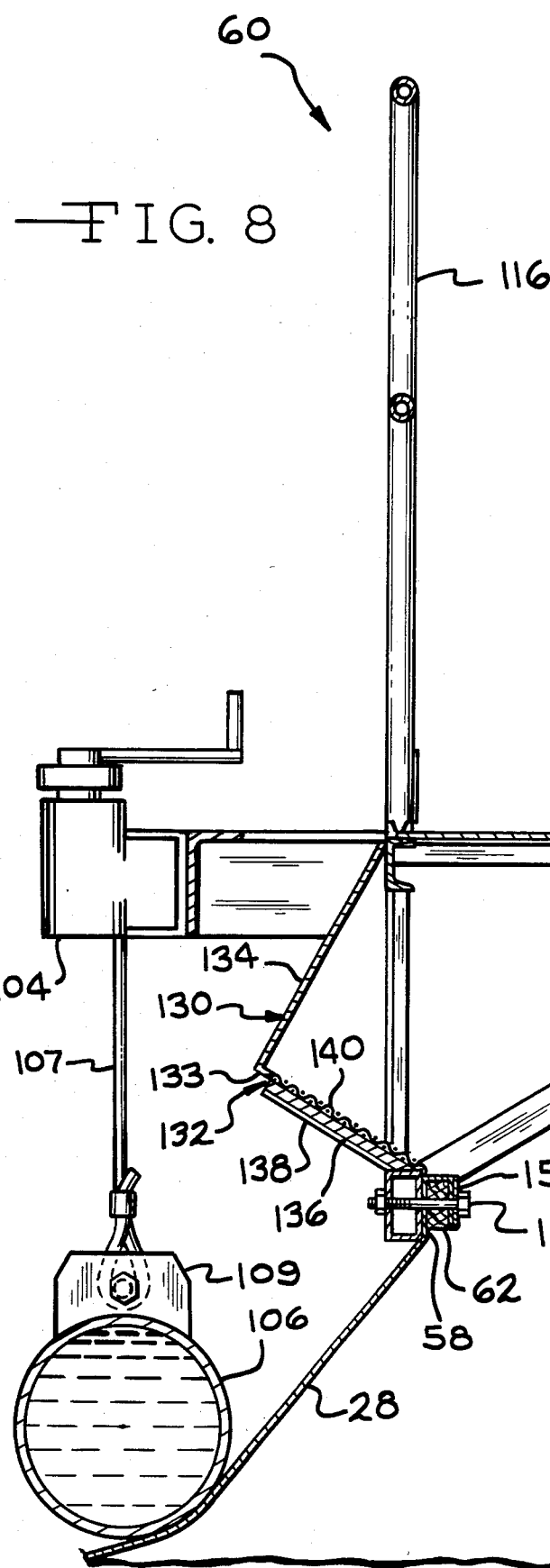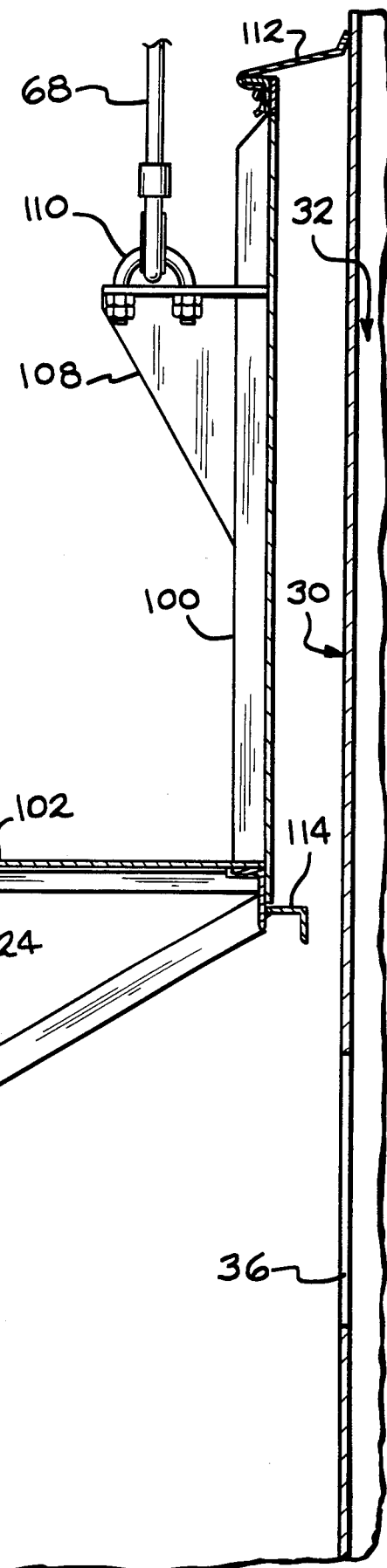

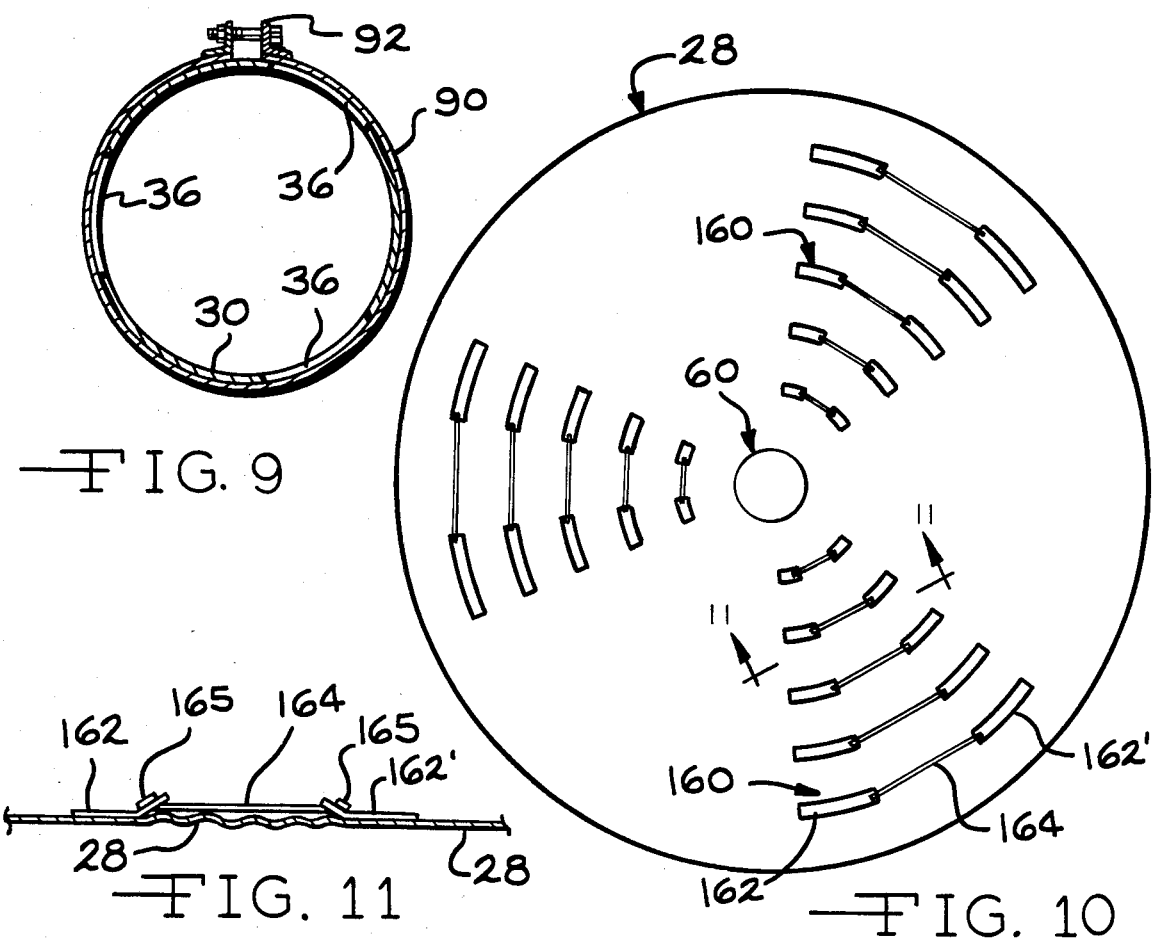
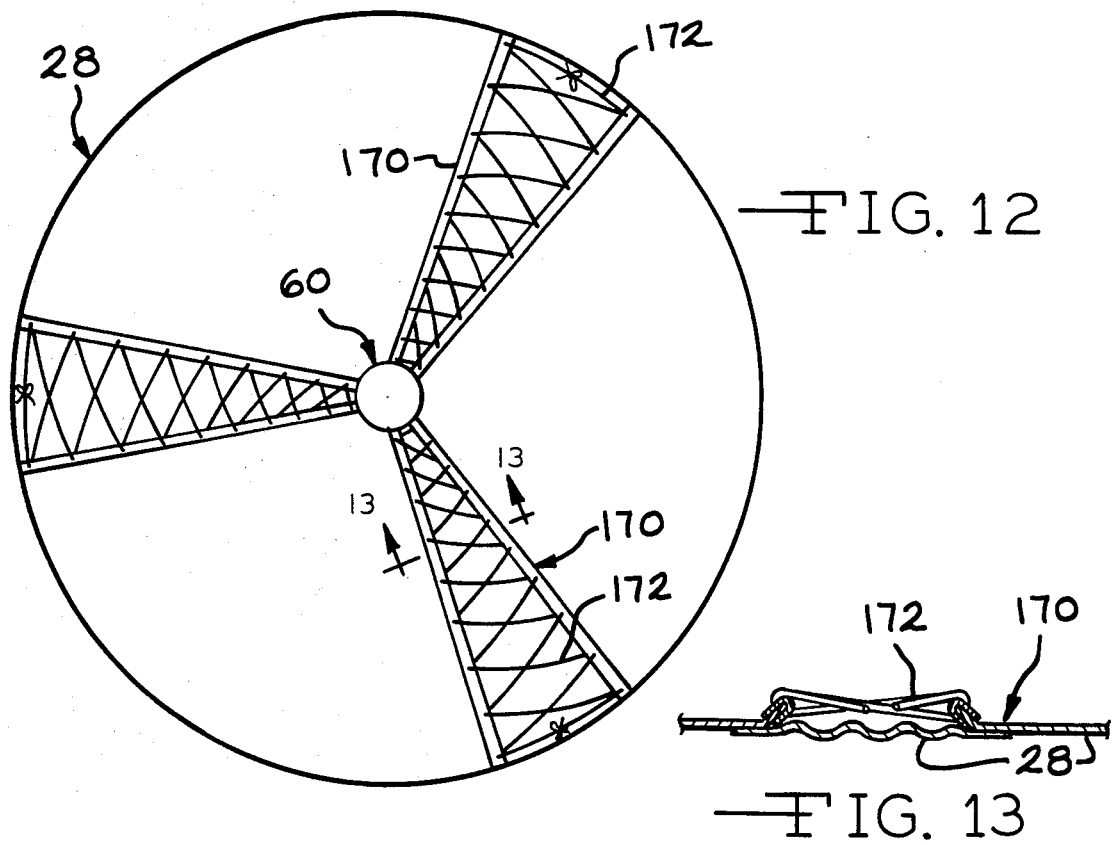

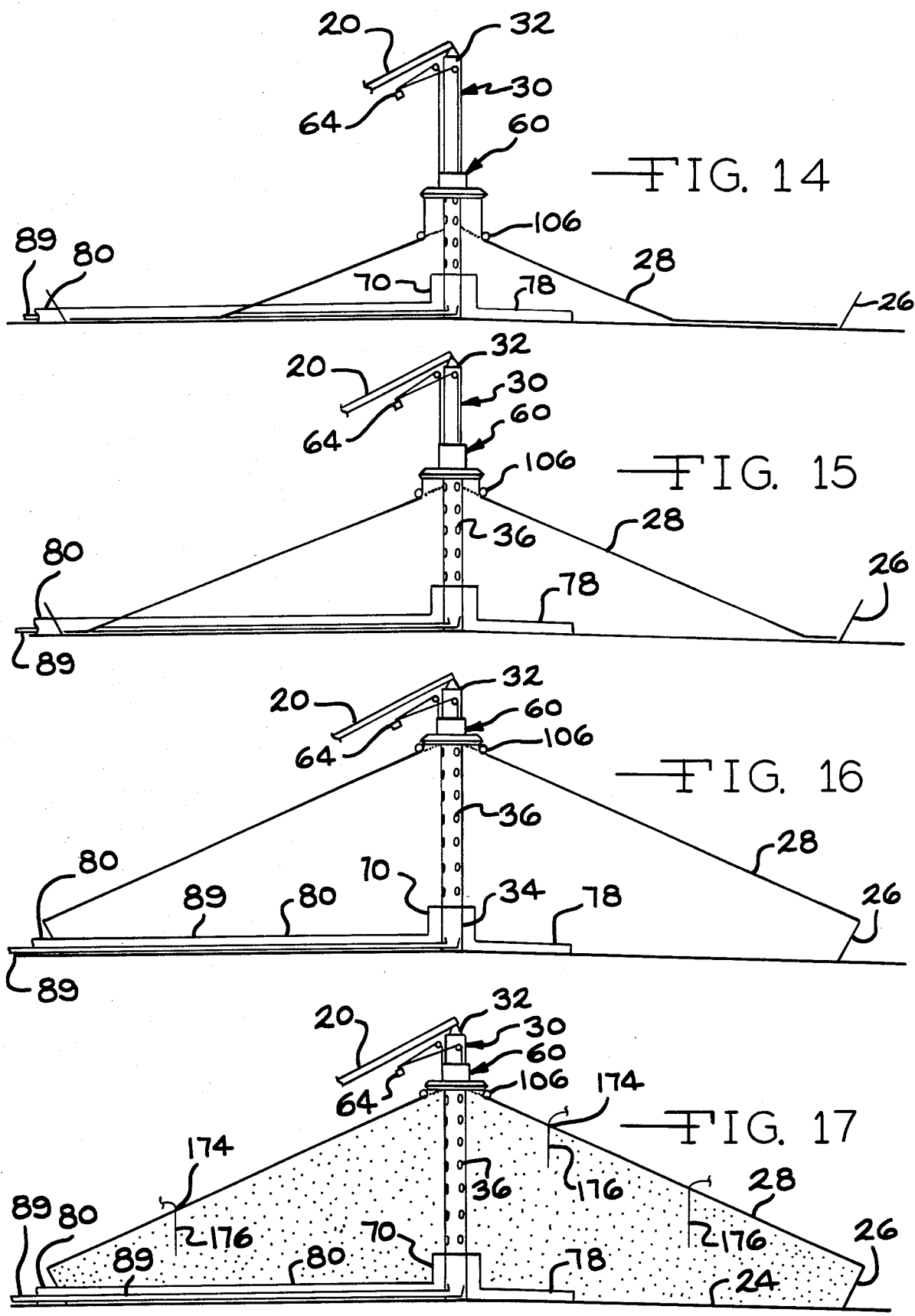

STORAGE STRUCTURE

BACKGROUND OF THE INVENTION

The present invention relates to an improved storage structure intended, among other uses, to provide low cost storage for grain materials. While low cost storage structures have shown potential for use as clean, efficient grain storage facilities, there are still persistant technological problems to be solved in the management and control of the storage structures and of the materials stored in them.

Current state-of-the-art low cost storage structures generally include a fabric cover positioned over a pile of particulate material to protect the material from the effects of the weather during the storage period. Prior art storage structures have also included a cover suspended over the stored grain or particulate material. The particulate material is then deposited under the cover. The covers of storage structures are sometimes stabilized by reinforcing ribs on the upper surface of the cover. Other prior art storage structures include a plurality of weights, such as tires, spaced at intervals over the top cover. The weights prevent the wind from blowing the cover off the top of the material being stored. Further prior art storage structures have also utilized a blower or fan generated vacuum to hold the cover in position against the top of the pile.

One problem with the covering of a pile of grain with a fabric cover occurs when concentric wrinkles or pockets form in the covering. As the particulate material is being deposited in the storage structure under the cover, the particulate material is caught by the pockets or wrinkles in the cover. This can cause interruptions in the filling of the structure, and damage to the cover.

In prior art covers where the center of the cover is elevated so that grain or other material may be placed below the cover, there is no structural support during filling to counteract wind forces.

The present invention provides a reliable, efficient, and low cost method and apparatus for storing grain without loss of its quality.

SUMMARY OF THE INVENTION

The invention relates to a storage assembly for storing particulate material. The storage assembly of the present invention includes a retaining means having a plurality of wall sections positioned such that the sections form a retaining wall. The retaining walls include air inlet means to allow air to flow through the wall sections. A cover is operatively attached to the base of the retaining wall during the initial phase of filling the storage assembly. The storage assembly further includes a cap. The cover is operatively attached to a base portion of the cap. An important feature of the present invention is that the grain or particulate material itself is adjacent the cover and cap throughout filling. Wind forces are counterbalanced by this overall assembly. The particulate material is supplied to a first, upper end of a chute which is central to the cap. The particulate material flows from the the chute through a plurality of openings in the chute. The invention further provides means for circulating air through the pile of stored material. The air circulating means includes a plenum located at the base of the chute, a plurality of air ducts and a fan means. The air ducts extend from the plenum adjacent the chute in a radial direction towards the retaining wall. The air ducts extend through a portion of the retaining wall to the exterior environment. The fan means is operatively attached to the distal portion of the air ducts.

The present invention includes a means for maintaining an optimal temperature within the stored pile of particulate material and for cleansing the stored pile of fine particles which block air flow. The cap includes a plurality of air inlet means to allow air to flow into the storage pile during and after the deposition of material in the storage assembly.

An important feature of the invention is a ring assembly which is suspended from the cap. While the ring assembly is a torus as disclosed in the present drawings, the ring assembly can have numerous shapes and still fall within the scope of the present invention and claims. For examples, the ring member may be a welded rectangular structure or a flat elliptical assembly. The torus, which is suspended below the cap, acts to hold the cover in contact with the grain and taut along any radial line, so that all wrinkles are radial, which do not catch grain; concentric wrinkles or pockets, which do catch grain, are absent. During the initial phase of filling the storage assembly, the cap and torus are in a first, lowered position on the center chute adjacent the bottom portion of the chute. As the material continues to be deposited in the storage assembly, the torus and cap are moved upwardly along the chute. The torus is also moved toward the cap during this time so that the cover is held in contact with the material and optimum tension is maintained along any radial line. After the storage assembly contains a sufficient amount of material such that the pile of material has extended to the base of the retaining wall, the cover is detached from the base of the retaining wall. The cover is now in its fully deployed position, with the radial wrinkles now gone also; the torus is now up to the cap and its function is completed. Additional particulate material is supplied to the storage assembly and such material is deposited along the height of the retaining wall. The cover is then tied down over the retaining wall.

During the filling phase of the storage assembly, the fan means can be operated to create a negative pressure under the cover. Because the cover is in contact with the material, less negative pressure is needed than for prior art covers. The small amount of negative pressure needed to counterbalance the wind is less likely to retard the flow of material under the cover. Further, the combination of the cover being in contact with the material, and a minimum amount of negative pressure needed to hold it in position, minimizes the stress caused by the negative pressure on the cover and cover lifting mechanism.

Control of the temperature profile within the stored pile of material is achieved by sensing the temperature at various locations within the pile and modulating cooling air flow through the pile to hold the temperatures within predetermined upper and lower limits.

In addition, the cover of the present invention may include a plurality of tie-down members positioned on or in the cover. Tension is not applied to these members until the storage structure is full and the cover is tied down over the retaining wall. The tie-down members on or in the cover are so oriented that tension can be applied concentrically. When this concentric tension is applied after the cover has first been tied down radially over the retaining wall, it forces the cover down against the stored material.

Other advantages and features of the invention will be apparent from the following description and drawings relating to the preferred embodiments.

BRIEF DESCRIPTION OF THE DRAWINGS

FIG. 1 is an elevational view, partially cutaway, of the storage assembly of the present invention.

FIG. 2 is a plan top view of the storage assembly of the present invention, partially in phantom.

FIG. 3 is a cutaway view taken along line 3—3 of FIG. 2.

FIG. 3A is a top plan view taken along line 3A—3A of FIG. 1.

FIG. 4 is a perspective view of a portion of a retaining wall of the present invention.

FIG. 5 is a cutaway view taken along line 5—5 of FIG. 4.

FIG. 8 is an elevational view, partially cutaway, taken along the line 8—8 in FIG. 6.

FIG. 9 is a cutaway view taken along the line 9—9 of FIG. 1.

FIG. 10 is a top plan view of a cover of the present invention.

FIG. 11 is a cutaway view taken along the line 11—11 of FIG. 10.

FIG. 12 is a top plan view of an alternative embodiment of a cover of the present invention.

FIG. 13 is a cutaway view taken along the line 13—13 of FIG. 12.

FIG. 14 is a diagramatic view of an initial fill phase of the present invention.

FIG. 15 is a diagramatic view of the present invention showing a later phase of the filling of the storage assembly of the present invention.

FIG. 16 is a diagramatic view of the present invention showing the storage assembly in a filled state.

FIG. 17 is a diagramatic view of the present invention, showing the materials stored in the storage assembly of the present invention.

FIG. 18 is a perspective view of an alternative embodiment of the chute of the present invention.

DESCRIPTION OF THE PREFERRED EMBODIMENT

Figure 6:
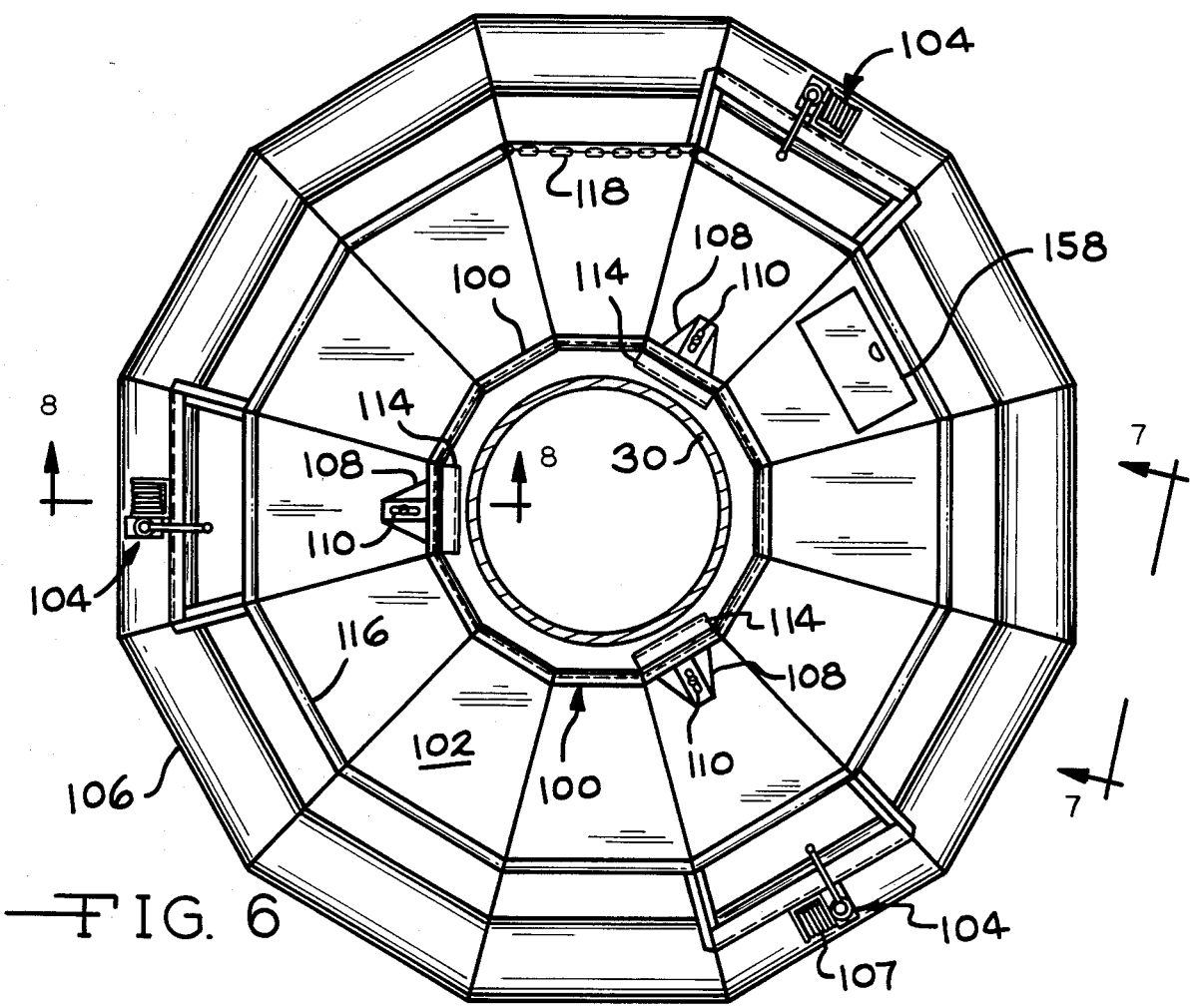
FIG. 6 is a cutaway view taken along line 6—6 of FIG. 1.

The storage assembly 22 generally includes a retaining wall 40, a cover 28, a chute 30, a cap 60, and air circulation means 70. Grain is delivered from the conveyor 20 to the top of the storage assembly 22. Grain falls from the conveyor 20 and is deposited into the storage assembly 22. In the preferred embodiment of the invention, the storage assembly 22 includes a chute 30 positioned at the center of the storage assembly 22. The chute 30 has a substantially cylindrical shape. The chute 30 has a first, open end 32 and a second end 34. The second end 34 of the chute 30 is firmly anchored to the bottom surface 24 of the storage assembly 22. The chute 30 is anchored in a vertical position by wire rope guy lines 38. Each guy line 38 is anchored in a concrete deadman 39. In a preferred embodiment, the chute guy lines 38 are spaced at approximately 120° from each other. The cute 30 includes a plurality of openings 36 spaced along the chute 30. In a preferred embodiment, the chute 30 has a diameter of approximately 42 inches, and the openings 36 have a diameter of approximately 12 inches. In addition, the openings 36 generally are spaced at 4 foot vertical intervals along the length of the chute 30 and the openings 36 are positioned at approximately 120° from each other. The grain enters the chute 30 through the open end 32 and falls in a downward direction towards the bottom surface 24 of the storage assembly 22. The grain falls into the second end 34 of the chute 30 and starts to fill the chute 30. As the grain continues to fall, the grain spills out of the chute 30 through the openings 36 onto the bottom surface 24 of the storage assembly 22. During the initial phase of filling the storage assembly 22, the grain is deposited on the bottom surface 24 in an area immediately adjacent the exterior circumference of the vessel 71 of the air circulation means 70. As additional grain is deposited in the storage assembly 22 the circumference of growing grain pile continues to radially extend in a direction towards a retaining wall 40. Thus, the outer periphery or circumference of the grain pile increases.

The bottom surface 24 radially slopes away from the chute 30 at a slight angle. The radial sloping of the bottom surface 24 prevents rain water or other standing water to accumulate on the bottom surfae 24. In a preferred embodiment, the bottom surface 24 is made of an asphalt and stone base and generally has a circular shape. The retaining wall 40 is positioned at an obtuse angle to the bottom surface 24. Referring now to FIGS. 1, 4, and 5, the retaining wall 40 includes a plurality of wall sections 41 positioned at an angle to each other such that the sections 41 form a substantially circular retaining wall 40. Each of the retaining wall sections 41 is supported by a plurality of braces or supports 42. The supports 42 are anchored to the bottom surface 24. Each of the retaining wall sections 41 further includes openings 48. Doors or valves 50 are positioned in opposing relationship to the openings 48. In the embodiment shown, the door 50 includes a hinge member 51 and a locking mechanism 52. A screen 54 is positioned in opposing adjacent relationship to each door 50. The individual doors 50 on each retaining wall section 41 can be opened to allow air to flow through the door 50, as will be described in detail below.

The indicated doors or valves 50 are manually operated, however, in other embodiments the valves 50 are automatically opened and closed in response to sensed grain and ambient air temperatures, wind velocities, and static pressures under the cover, which are analyzed and responded to by a microprocessor. In another embodiment, a sector of openings through the retaining wall are surrounded by a plenum chamber. The individual plenum chambers are then controlled manually or automatically to aerate the grain in the respective sectors and to hold down the cover.

The cover 28 is made of a generally waterproof material such as a canvas or a polyvinyl choloride plastic material and has a substantially frustoconical shape. The cover 28 has an outer periphery 56 and a center portion 58. The cover 28 is anchored at the base of the retaining wall 40 during the initial fill phase of the storage assembly 22. The outer periphery 56 of the cover 28 includes a plurality of end portions 180. Each end portion 180 defines a sleeve 182, as best seen in FIG. 4. Each sleeve 182 is adapted to receive a rigid member 184. In the preferred embodiment, the rigid member 184 is a cylindrical metal tube. After the grain has reached the base of the retaining wall 40, the outer periphery 56 is detached from the retaining wall. After the grain has further reached the top of the retaining wall 40, the outer periphery 56 is positioned over the upper end of the retaining wall 40. The rigid member 184 is slideably positioned within the sleeve 182 defined by the end portion 180. A plurality of securing members 186 are affixed to each rigid member 184 and are operatively secured or connected to the supports 42 of the retaining wall sections 41. The center portion 58 of the cover 28 terminates at the cap 60 and is operatively attached to the cap 60. As seen in FIG. 8, the cover 28 is operatively attached to the cap 60 by securing the center portion 58 of the cover 28 around a gripping surface 62, such as a 2"×4" board, and operatively connecting the gripping surface 62 to the cover 28 and to the cap 60. The center portion 58 of the cover 28 is wrapped around the gripping surface 62 and further attached to the cap 60 by a metal plate 154 and a bolt and nut means 156. The center portion 58 of the cover 28 is held in a substantially waterproof relationship with the cap 60.

The cap 60 is operatively connected to a winch 64 and is axially positioned around the chute 30. The winch 64 is operatively connected to the cap 60 by three cables 68 through three pulleys 66. The pulleys 66 are attached to the first end 32 of the chute 30.

The cap 60 includes an annular sleeve 100 axially positioned around the chute 30, a work platform 102 extending radially from the annular sleeve 100 and substantially surrounding the annular sleeve 100, and a plurality of ring member winches 104. In the embodiment shown, three ring member winches 104 are spaced apart at approximately 120° from each other. A ring member or torus 106 is suspended from the winches 104 by cables 107. The torus 106 has a substantially smooth exterior surface such that the movement of the torus 106 along the cover 28 does not damage or tear the cover 28. As best seen in FIG. 8, each of the winches 104 is affixed adjacent the outer perimeter of the work platform 102. Each of the winches 104 is operatively attached to the torus 106 by cables 107. Each cable 107 extends through steel plates 109 mounted on the torus 106. In the preferred embodiment, the torus 106 is a steel material which can be filled with a non-freezing solution such as water and anti-freeze solution, or a salt water solution. The torus 106 is suspended from the winches 104 and coaxially surrounds the chute 30.

Figure 7:
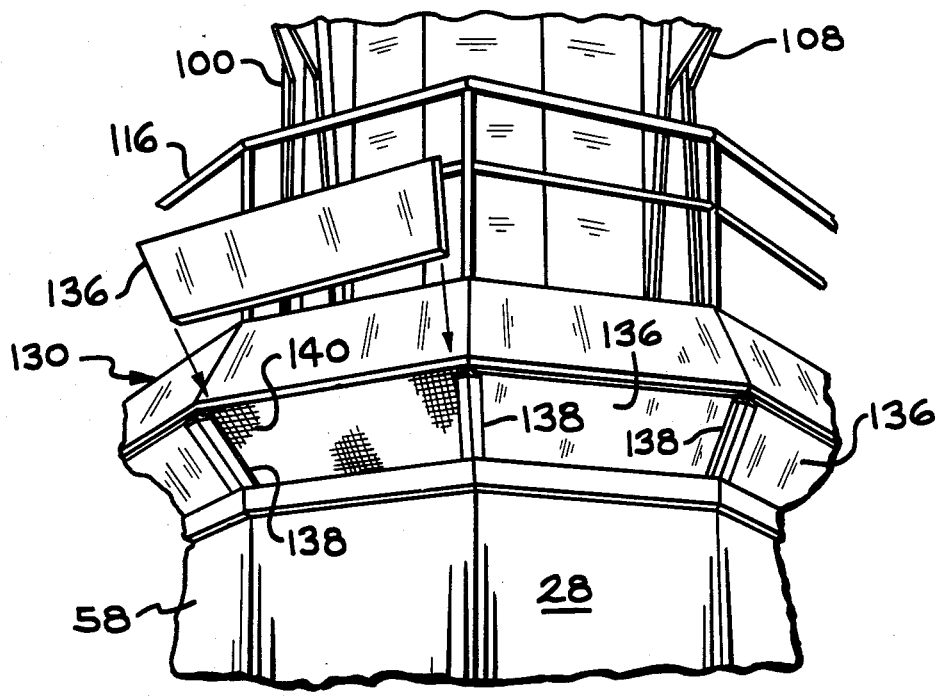
FIG. 7 is a view along line 7—7 in FIG. 6.

Referring now to FIGS. 6, 7 and 8, and in particular to FIG. 8, the cap 60 is shown positioned around the chute 30. The annular sleeve 100 of the cap 60 further includes three steel gussets 108 extending radially from the exterior surface of the annular sleeve 100. Three U-bolts 110 are operatively attached to the steel gussets 108. The three cables 68 extend from the winch 64 and are attached to the U-bolts 110. The cap 60 is suspended from the first or upper end 32 of the chute 30 by the cables 68. The cap 60 further includes a weather covering 112 which extends between the annular sleeve 100 and the chute 30 and which slides along the chute 30. The covering 112 prevents precipitation and uncontrolled air from entering the storage assembly 22. The cap 60 further includes a plurality of angled members 114 fixed adjacent the lower portion of the annular sleeve 100. The angled members 114 extend radially inwardly towards the chute 30. The angled members 114 prevent the cap 60 from swaying too much.

The work platform 102 extends around the perimeter of the annular sleeve 100. The work platform 102 is sloped away from the annular sleeve 100 at a slight angle to prevent rain or other moisture from collecting on the work platform 102. A safety handrail 116 is positioned around the periphery of the work platform 102.

A chain gate 118 is operatively connected to the handrail 116. Access to the work platform from the cover 28 from the level of the torus is by a rope ladder. The work platform 102 includes an inspection door 158 that can be opened to inspect the loading of the grain into the storage assembly 22.

The cap 60 further includes air inlet means 130 adjacent the lower surface 124 of the work platform 102. This air inlet means is an important feature of the present invention. The air inlet means 130 is located at the outer perimeter of the work platform 102. The air inlet means 130 includes a plurality of openings 132 located adjacent the perimeter of the work station 102. Each opening 132 includes a shield 134 and a valve or door 136. The shield 134 is positioned at an angle to the work platform 102 such that the shields 134 act as a shed to prevent rain or other precipitation from entering the openings 132. Each opening 132 is operatively covered by a door 136 affixed adjacent an outer edge 133 of the shield 134. Each door 136 is slideably positioned in supports 138. A screen 140 is operatively attached adjacent each opening 132 and each door 136. One or more of the doors 136 can be removed or partially opened to allow air to flow in through the openings 132 in the cap 60 and into the storage assembly 22.

Referring now to FIGS. 3 and 3A, the chute 30 is physically connected at its second or lower end 34 to the air circulation means 70. The air circulation means 70 includes a vessel 71 which axially surrounds the second end 34 of the chute 30. The vessel 71 defines a longitudinally extending annular space 72 between the outer surface of the chute 30 and the inside surface of the vessel 71. The vessel 71 includes a plurality of small apertures or perforations 73 extending through the walls of the vessel 71 and closely spaced on the walls of vessel 71. The vessel 71 further includes a plurality of openings 74 spaced at intervals around the base 76 of the vessel 71. Inlet pipes 78 are operatively attached to each of the openings 74 in the base 76 of the vessel 71. The inlet pipe 78 of the preferred embodiment is made of a hollow, perforated, substantially rigid material. Each inlet pipe 78 extends radially from the vessel 71, as best seen in FIG. 3A. The inlet pipes 78 are perforated to allow air to flow through the perforations into the inlet pipe 78. A cable 79 is operatively connected to the distal end 77 of each of the inlet pipes 78 in a looping or circular fashion such that each inlet pipe 78 may be disconneted from the vessel 71 by grasping the cable 79 and pulling the cable 79 in a radial direction away from the vessel 71 to detach the inlet pipe 78. The inlet pipes 78 are detached from the vessel 71 when grain is being removed from the storage assembly 22. The air circulation means 70 further includes one or more air ducts 80 and 82 and fan means 88. The air ducts 80 and 82 extend from the vessel 71 in a radial direction. The air ducts 80 and 82 penetrate the wall of the vessel 71. The air ducts 80 and 82 terminate in a plenum 84. The plenum 84 includes a plurality of openings 86. Fan means 88 are operatively positioned immediately adjacent each opening 86.

The fan means 88 acts to circulate air from the exterior environment through the grain pile as follows: air flows through the grain pile through the openings 48 on the retaining wall 40 and through openings 132 on the cap 60. Air flows through the stored grain pile and into the annular space 72 through the perforations in the vessel 71 and through the perforations in each inlet pipe 78. Air flows through the inlet pipes 78, through the openings 74 in the vessel 71, and into the annular space 72. The air flows from the annular space 72 through the air ducts 80 and 82 to the fan plenum 84 and exits to the exterior environment through the fan means 88.

The four fan means 88 are each equipped with an exhaust door which can be either fully opened or fully closed. In addition, one of the fan means 88 is equipped with a choke slide which can be held in any predetermined position such that air flow through the fan means 88 can be choked off completely or not at all or anywhere in between. A further use of the four exhaust doors and the choke slide is given toward the end of this description.

An auger 89, which is axially positioned in one of the air ducts 82, and which can draw material only from the second end 34 of the chute 30, is used to remove fine material from the center of the pile. The use of this auger is detailed more fully toward the end of this description.

The chute 30 further includes a plurality of cylindrical covers 90, as best seen in FIG. 9. Each of the covers 90 coaxially surrounds a portion of the chute 30. Each cover 90 is held in close adjacent relationship to the chute 30 such that a row of openings 36 in the chute 30 are covered by one of the covers 90. The covers 90 act to prevent rain or other moisture and uncontrolled air from entering the chute 30 through the openings 36 when the storage assembly 22 is awaiting grain. Each cover 90 is removed from the chute 30 by loosening the locking mechanism 92 operatively attached to the exterior surface of the covers 90. During filling, covers 90 are systematically removed to allow particulate material to pass through the complementary openings 36 as the pile increases vertically. The annular sleeve 100 of the cap 60 is sufficiently high to encompass at least one uncovered row of openings 36 positioned over the next lower row of openings 36 which are currently discharging grain or other particulate material.

In one embodiment, the cover 28 can include a plurality of tie-down members 160 positioned on the cover 28, as seen in FIGS. 10 and 11. The tie-down members 160 include anchoring tabs 162 and 162' positioned in spaced apart relationship to each other. An elastomeric material 164 is attached at its ends 165 to the anchoring tabs 162 and 162'. The anchoring tabs 162 and 162' extend around a portion of the cover 28. In a preferred embodiment, each set of anchoring tabs 162, 162' are larger than the preceeding set of anchoring tabs such that the outermost anchoring tabs 162, 162' cover a proportionally larger section of the cover 28. The elastomeric tie-down members 160 aid in holding the cover 28 in a snug relationship against the pile of grain stored in the storage assembly 22. An alternative embodiment is shown in FIGS. 12 and 13. The cover 28 includes a plurality of tie-down members 170. The tie-down members 170 radially extend from the center portion 58 of the cover 28 toward the outer periphery 56 of the cover 28. A shoestring or tie material 172 is laced through the tie-down members 170 such that the cover 28 is drawn tightly against the grain or particulate material stored in the storage assembly 22. A rachet mechanism (not shown) aids in tightening the shoestring tie-down members 170. The tie-down members 170 act to gather excess cover material 28 such that the cover 28 is held in a snug position over the stored material. The tie-downs 160 and 170 reduce the effect of wind.

The arrangement of the storage assembly 22 causes a relatively even and symmetric deposition of grain. But it is desirable to control the final deposition so that the stored material is very symmetrical, and filled to the top of the retaining wall evenly. In one embodiment, a spout 195 is positioned on the chute 30, as seen in FIG. 18. The spout 195 receives grain from adjacent openings 36 of the chute 30 and discharges the grain at the distal end 197 of the spout 195 onto the grain pile. The spout 195 extends radially from the chute 30 at an angle such that the downward angle of the spout 195 aids the flow of the grain onto the grain pile. The spout 195 can be rotated 360° around chute 30. It is made so that it can be put onto or removed from the chute 30 at any time. It is left off the chute 30 until the storage assembly 22 is almost full. It is then installed, and the final deposition of grain against the retaining wall is controlled by movement of the spout 195 to any desired radial direction.

The storage assembly 22 of the present invention is operated in as follows: the grain is delivered from conveyor 20 into the upper open end 32 of the chute 30. Grain falls out from the chute 30 through the spaced vertical openings 36 and onto the bottom surface 24 of the storage assembly 22. The cover 28 is positioned on the storage assembly 22 prior to the introduction of grain into the storage assembly 22. The cover 28 is deployed in a first, lowered position. The winch 64 is operated such that the cap 60 extends downwardly along the chute 30 to a lowered position. In like manner, the winches 104 on the cap 60 are operated such that the torus 106 extends to a downward position along the chute 30. It is desirable that the cover 28 remain in a lowered position adjacent the stored grain material in order to have as little air as possible trapped underneath the cover 28. As such, the cap 60 and the torus 106 are operatively moved to lowered positions along the chute 30. The cap 60 and torus 106 act to place tension on the cover 28 such that any wrinkles or excess material of the cover 28 are oriented in a radial manner and not in a circumferential manner. Because the radial distance along the cover is the same as the hypotenuse of a triangle defined by the cover, the vertical axis of the chute and the radius of the bottom surface, the function of the cap and its vertically adjustable torus is to tension the cover material until the distance from the top of the cover to the torus plus the distance from the torus to the outer edge of the cover equals such hypotenuse or radial distance. This is most important since it minimizes the effect of wind forces during loading and also minimizes the formation of circumferential or other non-radial folds in the cover.

During the initial fill phase of the storage assembly 22, the torus 106 is in its lowermost position along the chute 30 to keep tension on the cover 28. The cover 28 is operatively attached to the retaining wall 40 adjacent the base of the retaining wall 40. As the grain continues to fill the storage assembly 22 the grain is deposited along the bottom surface 24. When the grain reaches the retaining wall 40, the cover 28 is untied or detached from the base of the retaining wall 40. Additional grain is supplied to the storage assembly 22 and deposited along the full height of the retaining wall 40. The outer periphery 56 of the cover 28 is then placed over the upper end of the retaining wall 40 and tied down. As the cover 28 is raised and the grain approaches the retaining wall 40 the torus 106 is elevated towards the work platform 102 of the cap 60. By the time the pile of stored grain material reaches the base of the retaining wall 40, the torus 106 has been moved to a position adjacent the cap 60.

Progressive filling of the cover 28 is illustrated in FIGS. 14–17.

During the storage of the grain in the storage assembly 22, it is desirable to maintain temperatures within predetermined upper and lower limits within the stored grain pile. In a preferred embodiment, the cover 28 contains a plurality of small apertures 174. The temperature of the grain pile is monitored at various times by thermocouples 176 which have been introduced through the apertures 174 into the stored grain pile. The leadwires from the thermocouples 176 extend upward through the apertures 174 to the outside of the storage assembly 22, where the temperatures sensed by the thermocouples can be read with a suitable instrument.

The control of the temperature within the stored pile of grain is achieved by controlling the flow of air through the stored pile of grain. One or more of the valves or doors 50 in the retaining wall sections 41 can be opened such that air flows through the opening 48 adjacent the open door or doors 50. The air is circulated through the stored grain pile by the operation of the fan means 88. In addition, one or more of the doors 136 on the cap 60 can be opened such that air flows through the opening 132 adjacent the open door 136. In a preferred embodiment, the doors 136 on the cap 60 can account for approximately 25% of the airflow through the stored grain pile. The doors 50 on the retaining wall 40 can account for the remainder of the airflow through the stored grain pile.

When the temperature of the stored grain is acceptable and little or no wind is blowing, it is not necessary to run any of the fan means 88. When the temperature of the stored grain is acceptable, but a strong enough wind is blowing, it is desirable to have static pressure under the cover 28 without air flow. When air flow is required, it may be required with little or much concomitant static pressure under the cover 28 depending on how hard the wind is blowing. Running zero, one, two, three, or four of the four fan means 88, plus positioning the four exhaust doors on the four fan means 88, and the choke slide, which is on one of the fan means, in concert with the openings 48 in the retaining wall 40 and openings 132 in the cap 60, allow the maximum in combinations of static pressure only without air flow, maximum air flow, where desired, with concomitant static pressure, or any level of air flow less than maximum, also where desired, with a concomitant desired level of static pressure.

As grain is deposited in the grain storage assembly 22, fine material is concentrated near the chute 30 and concentrically around it. The fine material together with the whole grain it is imbedded within can be removed by an auger 89, which is axially positioned in one of the air ducts 82. When this is done, the cap 60 is lowered slightly by the winch 64, so that the cover 28 over the depression causes by the removal of the fines and whole grain describes a catenary along any radial line. Further, the openings 48 in the retaining wall 40 and openings 132 in the cap 60 are closed, and negative pressure is applied by one of the fan means 88. The depression is then refilled with grain. Since the amount of fine material near the chute 30 is proportional to the distance the grain flows from the chute 30, the amount of fine material near the chute 30 is much less in the grain after the depression has been refilled. The net result is improved air flow in the center of the pile.

If the storage assembly 22 is only filled to any amount up to the point where the grain reaches the base of the retaining wall 40, or in any event, during the filling of the storage assembly 22 up to the base of the retaining wall 40, the only controlled way of admitting air is through the openings 132 in the cap 60.

In order to control dust emissions, negative pressure can be applied to the storage assembly 22 throughout its filling.

The center of a pile of grain which has been filled from the center is the most difficult part of the pile to get air through. The combination of the cap 60 and air inlet means 130, the vessel 71 and air inlet pipes 78, and the provision for the removal of fine material, all symmetrical about the center, is an improved combination for assuring air flow in the center of the pile.

The above-detailed description of the present invention is given for explanatory purpose. It is to be understood that the storage structure of this invention can be used to store a wide variety of products. It will be apparent to those skilled in the art that numerous other changes and modifications can be made in the preferred embodiments of the invention described above without departing from the scope of the invention. Accordingly, the whole of the foregoing description is to be construed in an illustrative and not in a limitative sense, the scope of the invention being defined solely by the appended claims.

What we claim is:

1. An improved storage assembly for storing a particulate material, said storage assembly comprising, in combination,
   a vertically extending chute having vertically spaced openings;
   a cap assembly surrounding said vertically extending chute and mounted for movement on said vertically extending chute;
   a cover having its upper end operatively attached to said cap assembly; and
   a ring assembly vertically movable on said cap assembly and engaging said cover, whereby said ring assembly may be vertically moved relative to said cap assembly, said cover being tensioned by said ring assembly retarding the formulation of circumferential folds in said cover during loading.

2. An improved storage assembly according to claim 1, including retaining means surrounding said cover.

3. An improved storage assembly according to claim 2, wherein said retaining means includes a generally vertical wall, said cover being attached adjacent said wall.

4. An improved storage assembly according to claim 3, wherein said wall defines a plurality of circumferentially spaced openings and valve means operatively connected to said openings.

5. An improved storage assembly according to claim 1, wherein said chute comprises a cylindrical member and a plenum adjacent the bottom of said cylindrical member.

6. An improved storage assembly according to claim 1, wherein said cap assembly surrounds said vertically extending chute, said cap assembly defining a plurality of spaced openings, said openings defining a fluid flow path with the interior of said cover, and valve members mounted adjacent said spaced openings, whereby one or more valve members may be moved to establish such fluid flow path to the interior of said cover.

7. An improved storage assembly according to claim 6, including shields mounted over each of said spaced openings.

8. An improved storage assembly according to claim 1, wherein said ring assembly comprises a torus.

9. An improved storage assembly according to claim 8, wherein said torus comprises a hollow metallic body, said body being fillable with a liquid having a low freezing point.

10. An improved storage assembly according to claim 8, including winch means between said cap assembly and said torus for adjusting the vertical distance between said cap assembly and said torus.

11. An improved storage assembly according to claim 6, including a retaining means surrounding said cover, said retaining means including a wall defining a plurality of spaced openings, and fan means in communication with such horizontal openings in said cap assembly and said spaced openings in said wall whereby air may be supplied to the particulate material or used to hold down said cover.

12. An improved storage assembly according to claim 1, including auger means adjacent the bottom of said chute for removing fines and other particles from beneath said cover.

13. An improved storage assembly according to claim 1, including tie-down means on said cover for forcing the cover down against the stored particle material.

14. An improved method for storing a particulate material beneath a generally conical cover having an opening adjacent its upper end,
- introducing said particulate material through the opening;
- maintaining said cover adjacent said particulate material by applying a force ring to the cover to tension said cover and retard the formation of circumferential folds;
- raising said cover relative to the addition of particulate material through the opening;
- and adjusting the vertical position of the force ring to maintain the tension on the cover.

15. An improved method according to claim 14, and providing a fluid flow to aerate the particulate material or to hold the cover adjacent the particulate material.

16. An improved method according to claim 15, including sensing the temperature of the particulate material and adjusting the fluid flow in accordance with the sensed temperature.

17. An improved storage assembly for storing a particulate material, said storage assembly comprising, in combination,
- a vertically extending chute having vertically spaced openings, said chute defining a central vertical axis;
- a cap assembly having air inlet openings symmetrically mounted relative to such central axis for movement on said vertically extending chute, said cap assembly surrounding said vertically extending chute;
- a cover having its upper end operatively attached to said cap assembly;
- a ring assembly vertically movable on said cap assembly and engaging said cover, said ring assembly being symmetrical to such central vertical axis, whereby said ring assembly may be vertically moved relative to said cap assembly, said cover being tensioned by said ring assembly retarding the formation of circumferential folds in said cover during loading;
- a symmetrical vessel surrounding the lower end of said chute;
- a plurality of air inlet pipes in communication with said vessel and extending radially outwardly from said vessel;
- auger means for moving fine material extending from said vessel radially outwardly, whereby such removal of fine material is symmetrical; and
- the combination of said cap, said symmetrical vessel and symmetrical removal of fine materials assures air flow in the center of the particulate material pile.

* * * * *